No. 665,650. Patented Jan. 8, 1901.
V. H. CLYMER.
AUXILIARY BOOK GUIDE.
(Application filed Jan. 6, 1900.)

(No Model.)

WITNESSES:
H. B. Smith
J. J. Laass

INVENTOR.
Virgil H. Clymer
By E. Laass
ATTORNEY.

UNITED STATES PATENT OFFICE.

VIRGIL H. CLYMER, OF SYRACUSE, NEW YORK.

AUXILIARY BOOK-GUIDE.

SPECIFICATION forming part of Letters Patent No. 665,650, dated January 8, 1901.

Application filed January 6, 1900. Serial No. 550. (No model.)

*To all whom it may concern:*

Be it known that I, VIRGIL H. CLYMER, a citizen of the United States, and a resident of Syracuse, in the county of Onondaga, in the State of New York, have invented new and useful Improvements in Auxiliary Book-Guides, of which the following, taken in connection with the accompanying drawings, is a full, clear, and exact description.
The object of this invention is to provide a simple and convenient book-guide to be inserted into a book for affording more ready access to references or articles of comment contained in different parts of the book and relating to the same subject, said devices thus facilitating the study or digest of said subject; and to that end the invention consists in the novel construction of the reference-slips and means for sustaining them removably between the leaves of the book, as hereinafter described, and set forth in the claims.

Figure 1:
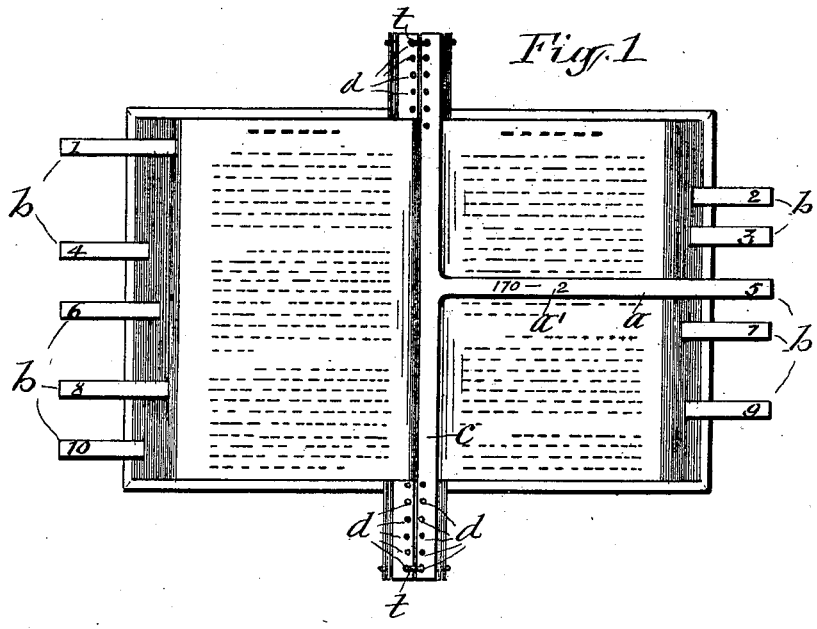
Figure 2:
Figure 3:
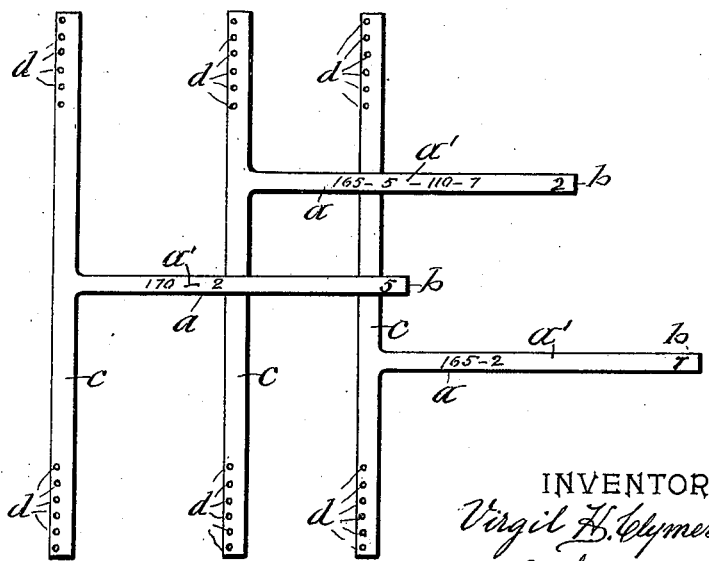

In the annexed drawings, Figure 1 is a face view of a book opened and equipped with my invention. Fig. 2 is a front edge view of said book in its closed condition, and Fig. 3 is a detached plan view of some of the component parts of my invention.

*a* represents one of the reference-slips, a plurality of which are required to attain the object of my invention. Each of these slips is designed to be inserted between pages containing one or more of the correlative references to the main subject under consideration. The slip is of sufficient length to protrude from the book, as shown at *b*, and the protruding portions of the series of slips are marked either with consecutive numbers, as shown, or with other suitable indexes for specially distinguishing the references. The body or main portion of each of said slips has a writing-surface *a'* upon which to mark the indexes of the companion slips indicating the pages containing the nearest or most direct references to the same subject. In order to retain said reference-slips in their required positions in the book, I either attach them to or form them integral with bands *c*, from which they extend at right angles. These bands are placed adjacent to the binding of the leaves and are of sufficient lengths to project from the upper and lower edges of the book and are fastened together by either wires or strings or other suitable ties *t*, passing through holes *d d* or otherwise suitably secured to the protruding ends of the bands.

The manner of using my said invention is as follows: A person having found the main subject sought in the book, he or she places the reference-slip indexed *l* in that part of the book containing the nearest reference to said subject and inserts the companion slips, with their index numbers or marks in consecutive order, into the different portions of the book containing sequential references to the subject. After the said slips are thus placed the bands *c c*, carrying the slips, are tied together at their ends, as shown at *t t*, to confine the reference-slips *a a* in their requisite positions in the book and convenient for subsequent use.

In the manufacture of my described invention I form the bands *c* and slips *a* of ample lengths to allow them to be used in books of different sizes. The excessive lengths of the protruding ends may be cut off as desired.

What I claim is—

1. An auxiliary book-guide consisting of reference-slips inserted between the leaves containing correlative references and each of said slips having a protruding portion indexed to specially distinguish the reference, and the main portion of the slip having a writing-surface upon which to mark the indexes of the companion slips, and bands connected at right angles to the inner ends of said slips to confine the same between the leaves.

2. An auxiliary book-guide consisting of reference-slips inserted between the leaves containing correlative references and each of said slips having a protruding portion indexed to specially distinguish the reference, and the main portion of the slip having a writing-surface upon which to mark the indexes of the companion slips, bands confining said slips in position, and ties fastening the bands together as set forth.

3. An auxiliary book-guide consisting of reference-slips inserted between the leaves containing correlative references and each of said slips having a protruding portion indexed to specially distinguish the reference, and the main portion of the slip having a writing-surface upon which to mark the indexes of the companion slips, and bands extending at right angles from the inner ends of the slips and provided with a plurality of perforations distributed lengthwise in the end portions thereof, and ties passing through the perforations and adjustably connecting them together as set forth.

VIRGIL H. CLYMER. [L. S.]

Witnesses:
H. B. SMITH,
J. J. LAASS.